United States Patent
Gallant et al.

(10) Patent No.: US 7,324,596 B2
(45) Date of Patent: Jan. 29, 2008

(54) LOW COMPLEXITY BLOCK SIZE DECISION FOR VARIABLE BLOCK SIZE MOTION ESTIMATION

(75) Inventors: Michael D. Gallant, Kitchener (CA); Eric C. Pearson, Conestogo (CA)

(73) Assignee: LSI Logic Corporation, Milpitas, CA (US)

( * ) Notice: Subject to any disclaimer, the term of this patent is extended or adjusted under 35 U.S.C. 154(b) by 824 days.

(21) Appl. No.: 10/690,884

(22) Filed: Oct. 22, 2003

(65) Prior Publication Data
US 2005/0013367 A1 Jan. 20, 2005

Related U.S. Application Data

(60) Provisional application No. 60/487,643, filed on Jul. 15, 2003.

(51) Int. Cl.
*H04B 1/66* (2006.01)
*H04N 7/12* (2006.01)
*H04N 11/04* (2006.01)

(52) U.S. Cl. ............................................... 375/240.16
(58) Field of Classification Search ................ None
See application file for complete search history.

(56) References Cited

U.S. PATENT DOCUMENTS

| 5,398,079 A | * | 3/1995 | Liu et al. ................ 348/699 |
| 5,488,419 A | * | 1/1996 | Hui et al. ............ 375/240.17 |
| 5,608,656 A | | 3/1997 | Purcell et al. |
| 6,061,397 A | * | 5/2000 | Ogura ...................... 375/240 |
| 6,108,039 A | | 8/2000 | Linzer et al. |
| 6,154,491 A | * | 11/2000 | Uetani .................. 375/240.16 |
| 6,304,603 B1 | * | 10/2001 | Kang .................. 375/240.16 |
| 6,380,986 B1 | * | 4/2002 | Minami et al. ............ 348/699 |

OTHER PUBLICATIONS

Sheu-Chich Cheng et al., "A Comparison of Block-Matching Algorithms Mapped to Systolic-Array Implementation", IEEE Transactions on Circuits and Systems for Video Technology, vol. 7, No. 5, Oct. 1997, pp. 741-757.

Eiji Ogura et al., "A 1.2-W Single-Chip MPEG2 MP@ML Video Encoder LSI Including Wide Search Range (H:±288, V:±96) Motion Estimation and 81-MPOS Controller", IEEE Journal of Solid-State Circuits, vol. 33, No. 11, Nov. 1998, pp. 1765-1771.

"Motion Estimation Engine with Parallel Interpolation and Search Hardware", Linzer et al., U.S. Appl. No. 10/325,188, filed Dec. 20, 2002.

* cited by examiner

*Primary Examiner*—Nhon Diep
(74) *Attorney, Agent, or Firm*—Christopher P Maiorana (57) ABSTRACT

An apparatus generally having a first circuit and a second circuit for motion estimation is disclosed. The first circuit may be configured to (i) generate a first motion vector for a block at an integer-pel resolution and (ii) determine a single block size associated with the first motion vector. The second circuit may be configured to (i) generate a plurality of second motion vectors at a sub-pel resolution by searching proximate the first motion vector using the single block size and (ii) determine a motion vector for the block as a particular one of the second motion vectors best matching a plurality of reference samples.

20 Claims, 7 Drawing Sheets

FIG. 1

| A11 | A12 | A13 | A14 | A15 |
|---|---|---|---|---|
| A21 | A22 | A23 | A24 | A25 |
| A31 | A32 | A33 bh11 | A34 bh12 | A35 |
| bv11 | bv12 | bv13 ch11 | bv14 ch12 | |
| A41 | A42 | A43 bh21 | A44 bh22 | A45 |
| bv21 | bv22 | bv23 ch21 | bv24 ch22 | |
| A51 | A52 | A53 bh31 | A54 | A55 |
| A61 | A62 | A63 | A64 | A65 |
| A71 | A72 | A73 | A74 | A75 |

FIG. 2

| | | | | |
|---|---|---|---|---|
| A11 | d11 | bh | d12 | A12 |
| e11 | h11 | f11 | h12 | |
| bv | g11 | ch | g12 | bv |
| e21 | h21 | f21 | i11 | |
| A21 | d21 | bh | d12 | A22 |
| e31 | h31 | f31 | h32 | |
| bv | g21 | ch | g22 | bv |
| e41 | h41 | f41 | i21 | |
| A31 | | bh | | A32 |

LOW COMPLEXITY BLOCK SIZE DECISION FOR VARIABLE BLOCK SIZE MOTION ESTIMATION

This application claims the benefit of U.S. Provisional Application No. 60/487,643, filed Jul. 15, 2003, which is hereby incorporated by reference in its entirety.

This application is related to co-pending applications Ser. No. 10/669,930, filed Sep. 24, 2003 and Ser. No. 10/682,631, filed Oct. 9, 2003 which are hereby incorporated by reference in their entirety.

FIELD OF THE INVENTION

The present invention relates to a digital video motion estimation generally and, more particularly, to a low complexity block size decision for variable block size motion estimation.

BACKGROUND OF THE INVENTION

Motion compensation that reduces temporal redundancy in the coding of image sequences uses a calculated tradeoff between motion model granularity (i.e., from per-pixel to per image), parameters (i.e., from translational to polynomial) and accuracy of the parameters (i.e., from continuous to discrete). Combined, the above factors affect an energy of a residual signal and a resulting bandwidth. Recent video compression standards employ a variable block-sized translational motion model, where each pixel within a macroblock or sub-macroblock undergoes the same motion, with sub-pel accuracy and interpolated samples on a pel grid being permitted to increase motion accuracy. Variable block-sized motion allows a wider range of block sizes (i.e., 4 horizontal (H) by 4 vertical (V), 4H×8V, 8H×4V, 8H×8V, 8H×16V, 16H×8V, and 16H ×16V) and provides better estimation of small and irregular motion fields resulting in a reduced number of bits for coding the residual signal compared with a fixed block-sized motion. Given the increased number of search parameters (i.e., the number of permitted block-sizes, search range, and motion vector accuracy), architectural/procedural tradeoffs are made to reduce the number of motion estimation processor cycles in order to make a cost-effective use of silicon area. A specific procedural problem is how to select the block size and interpolated position that produces a minimum search score.

An existing solution for motion estimation is to exhaustively search all interpolated positions for all block sizes. Another existing solution is to search a small window of interpolated positions around a best integer position for each block size (also determined independently for each block size). However, the exhaustive searches increase motion estimation processor cycles to generate and search the interpolated positions. Repeating for all block sizes further increases motion estimation processor cycles to search the interpolated positions. An increase is seen in motion estimation processor memory to store the interpolated samples. In addition, the existing solutions increase motion estimation processor memory to store the best integer and the best interpolated scores for all block sizes.

SUMMARY OF THE INVENTION

The present invention concerns an apparatus generally comprising a first circuit and a second circuit. The first circuit may be configured to (i) generate a first motion vector for a block at an integer-pel resolution and (ii) determine a single block size associated with the first motion vector. The second circuit may be configured to (i) generate a plurality of second motion vectors at a sub-pel resolution by searching proximate the first motion vector using the single block size and (ii) determine a motion vector for the block as a particular one of the second motion vectors best matching a plurality of reference samples.

The objects, features and advantages of the present invention include providing a method and/or apparatus for motion estimation that may (i) utilize registers to store the best integer-pel block sizes, scores and corresponding motion vectors, (ii) provide a small internal reference memory within a motion estimation processor for interpolated positions, (iii) provide a sub-pel interpolation data path, (iv) provide a small sub-pel sum of absolute differences array, (v) reduce motion estimation processor cycles for generating interpolated positions compared with conventional approaches, (vi) reduce motion estimation processor cycles for searching interpolated positions compared with conventional approaches, and/or (vii) store only best integer scores and motion vectors in the motion estimation processor memory.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
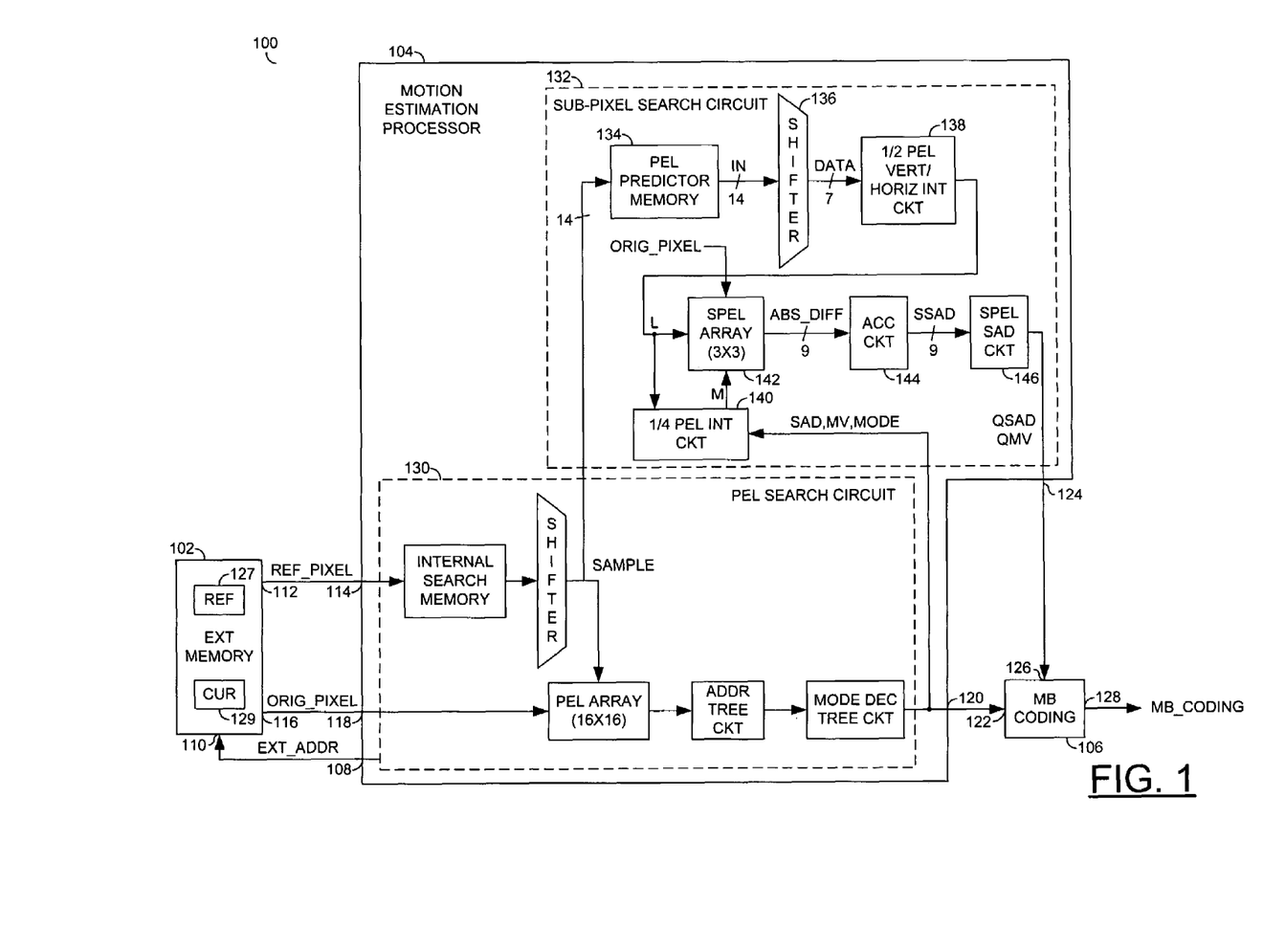
FIG. 1 is a block diagram of an apparatus in accordance with a preferred embodiment of the present invention.

Referring to FIG. 1, a block diagram of an apparatus 100 is shown in accordance with a preferred embodiment of the present invention. The apparatus (or system) 100 generally comprises a memory circuit (or module) 102, a circuit (or module) 104 and a circuit (or module) 106. The apparatus 100 may be configured to perform a variable block size motion estimation.

The circuit 104 may be implemented as a motion estimation (ME) processor circuit. The circuit 106 may be implemented as a macroblock (MB) coding circuit. The ME processor circuit 104 and the MB coding circuit 106 are generally implemented in a single integrated circuit. The memory circuit 102 may be implemented as an external memory circuit fabricated independently of the ME processor circuit 104 and the MB coding circuit 106.

An output 108 of the ME processor circuit 104 may present a signal (e.g., EXT_ADDR) to an input 110 of the external memory circuit 102. An output 112 of the external memory circuit 110 may present a signal (e.g., REF_PIXEL) to an input 114 of the ME processor circuit 104. An output 116 of the external memory circuit 102 may present a signal (e.g., ORIG_PIXEL) to an input 118 of the ME processor circuit 104.

An output 120 of the ME processor circuit 104 may present multiple signals (e.g., SAD, MV and MODE) to an input 122 of the MB coding circuit 106. An output 124 of the ME processor circuit 104 may present multiple signals (e.g., QMV, QSAD) to the MB coding circuit 106. An output 128 of the MB coding circuit 106 may present a signal (e.g., MB_CODING) transferring coding information for a macroblock.

The signal EXT_ADDR may be implemented as an address signal. The ME processor circuit 104 may generate the signal EXT_ADDR. The signal EXT_ADDR may be used as an address for read operations from the external memory circuit 102.

The signal REF_PIXEL may transfer reference frames that have been previously encoded and then decoded. The frames may represent one or more pictures used for motion estimation. Each frame generally comprises multiple reference blocks 127 (one shown). Each reference block 127 may be implemented as a macroblock. The reference blocks 127 may be arranged in a single or integer-pel resolution.

The signal ORIG_PIXEL may transfer current frames to be encoded. Each current frame generally comprises multiple current blocks 129 (one shown). Each current block 129 may be implemented as a macroblock.

The signal MODE may define the particular partition mode resulting in the best motion estimation for the current block 129. The signal MODE may identify seven different modes in designs of the apparatus 100 that may be capable of partitioning each of the current blocks 129 into sixteen smallest sub-blocks. The signal MODE may identify four different modes in designs of the apparatus 100 that may be capable of partitioning each of the current blocks 129 into four 8×8 sub-blocks. Other numbers of modes may be implemented to meet the criteria of a particular application.

The signal MV may define one or more motion vectors for the current block 129 with respect to the reference frame or frames at an integer-pel resolution. The number of motion vectors within the signal MV may be defined by a particular partition mode determined to be a best mode for the current block 129. For example, if the apparatus 100 determines that a MODE0 should be used for motion estimation, the signal MV may convey a single motion vector for the current block 129. If the apparatus 100 determines that a MODE3 should be used for motion estimation, the signal MV may convey four motion vectors, one for each of the four sub-blocks within the current block 129.

The signal SAD may define a sum of absolute difference value for the best mode determined by the apparatus 100. The signal SAD may include a bias value and/or a cost value incorporated before determining the best mode. The bias value and the cost value may be determined from quantization parameters and the motion vectors.

The signal QMV may define one or more motion vectors for the current block 129 with respect to the reference frame or frames at a sub-pel (e.g., quarter-pel) resolution. The number of motion vectors within the signal QMV may be defined by the particular partition mode determined from the integer-pel resolution search. Generally, one motion vector may be generated for each partition in the particular partition mode determined from the integer-pel resolution search. The motion vectors carried in the signal QMV may also fall on half-pel and/or integer-pel locations in the reference frames.

The signal QSAD may define one or more sum of absolute difference values for the best motion vector or vectors determined by the apparatus 100. The signal QSAD may be determined at half-pel and/or quarter-pel resolutions. The signal QSAD may convey the values for each partition of the particular partition mode, one SAD value for each partition. The signal QSAD may include one or more bias values and/or a cost values incorporated before determining the best vectors. The bias values and the cost values may be determined from quantization parameters and the motion vectors. In one embodiment, the bias values and cost values for the half-pel and quarter-pel resolutions may be different than the bias values and cost values used for the integer-pel resolution. In another embodiment, the bias values and cost values may be similar at all resolutions.

The signal MB_CODING may be implemented as a signal transferring encoded information for each current macroblock. The signal MB_CODING may include the motion vectors calculated at the integer-pel, half-pel and/or quarter-pel resolution. Other information may be included in the signal MB_CODING to meet the criteria of a particular application.

The ME processor circuit 104 generally comprises a circuit (or module) 130 and a circuit (or module) 132. The circuit 130 may be implemented as a pel search circuit. The circuit 132 may be implemented as a sub-pel search circuit. The pel search circuit 130 may provide a signal (e.g., SAMPLE) to the sub-pel search circuit 132. The pel search circuit 130 may also provide the signals SAD, MV and MODE to the sub-pel search circuit 132.

The signal SAMPLE may be implemented as a sequence of one or more reference samples (e.g., luminance component of the pixels) and/or pad samples. The pad samples may be artificial samples located outside the reference frame of actual picture data generated to support motion estimation where motion vectors may point outside the reference frame. The reference samples and pad samples transferred via the signal SAMPLE may define a reference block 127 against which the current block 129 may be compared during the motion estimation process. In one embodiment, the signal SAMPLE may transfer forty-eight samples in parallel substantially simultaneously.

The pel search circuit 130 may be operational to determine one or more motion vectors for a current block 129 of the video data. The pel search circuit 130 may perform a variable block size motion estimation at an integer-pel resolution to determine a best partition mode and associated motion vector or motion vectors. The pel search circuit 130 generally searches all integer positions for all block-sizes. Based on integer scores, the pel search circuit 130 may identify the block size that produces the minimum sum of absolute difference score. Additional details of the pel search circuit 130 may be found in the related applications, Ser. No. 10/669,930 filed Sep. 24, 2003, and Ser. No. 10/682,631 filed Oct. 9, 2003, which are hereby incorporated by reference in their entirety.

A sub-pel interpolation data path may be created by the sub-pel search circuit 132. The sub-pel search circuit 132 may be operational to determine a motion vector for each partition determined by the pel search circuit 130 per the signal MODE. The sub-pel search circuit 132 generally searches a small window of interpolated positions around or proximate the corresponding integer-pel position with the minimum score using the identified block size. The interpolated position that produces a minimum or lowest score may be considered a best match between the current block 129 and the reference data. The motion vector corresponding to the minimum QSAD score may be presented for macroblock coding.

An example pseudo-code for the motion vector search may be provided as follows:

```
For each blocktype do {
    For each blocktype's-subblock in macroblock do {
        Find best integer-pel position in search range
    }
}
For each blocktype do {
    Select optimal blocktype based on integer-pel scores
}
For optimal blocktype {
    Find best sub-pel position around best integer-pel position
}
```

The sub-pel search circuit 132 generally comprises a memory circuit (or module) 134, a circuit (or module) 136, a circuit (or module) 138, a circuit (or module) 140, a circuit (or module) 142, a circuit (or module) 144 and a circuit (or module) 146. The memory circuit 134 may receive the signal SAMPLE. The circuit 146 may generate the signals QSAD and QMV.

A signal (e.g., IN) may be presented from the memory circuit 134 to the circuit 136. A signal (e.g., DATA) may be generated be the circuit 136 based on the signal IN and presented to the circuit 138. A signal (e.g., L) may be generated by the circuit 138 based on the signal DATA and presented to the circuits 140 and 142. The circuit 140 may generate a signal (e.g., M) from the signal L. The circuit 142 may generate a signal (e.g., ABS_DIFF) based on the signals L and/or M. A signal (e.g., SSAD) may be generated by the circuit 144 from the signals L or M. The signals QSAD and QMV may be generated by the circuit 146 in response to the signal SSAD.

The memory circuit 134 may be implemented as a memory internal to the ME processor circuit 104. In one embodiment, the memory circuit 134 may be arranged to store 56 columns by 14 rows of sample data at a depth of a byte per sample. The signal IN may transfer a sequence of sample columns (e.g., 14 samples per column) to the circuit 136, one column at a time. Other memory sizes and/or transfer sizes may be implemented to meet a criteria of a particular application.

The circuit 136 may be implemented as a shifter circuit. The shifter circuit 136 may be operational to barrel shift samples read from the memory circuit 134 into multiple output positions. In one embodiment, the shifter circuit 136 may shift the column of samples (e.g., 14 bytes) received from the memory circuit 134 to align with seven output positions. The signal DATA may transfer the shifted and reduced column of samples (e.g., 7 bytes) to the circuit 138, one column at a time.

The circuit 138 may be implemented as a half-pel interpolation circuit. The half-pel interpolation circuit 138 may be operational to interpolate the samples of reference data from the integer-pel resolution to the half-pel resolution. The half-pel interpolation may be preformed using horizontal and vertical multi-pole (e.g., 6-pole) filters. The vertical filter generally determines interpolated reference samples at vertical and diagonal positions between the actual reference samples of the reference frame. The horizontal filter may determine interpolated reference samples at horizontal positions between the actual reference samples. Interpolation filters may be implemented to meet the criteria of a particular application. For example, the interpolation filters may be normative filters, as defined by a standard, or approximations thereof. The signal L may transfer the actual reference samples and the half-pel interpolated reference samples to the circuits 140 and/or 142.

Figure 2:
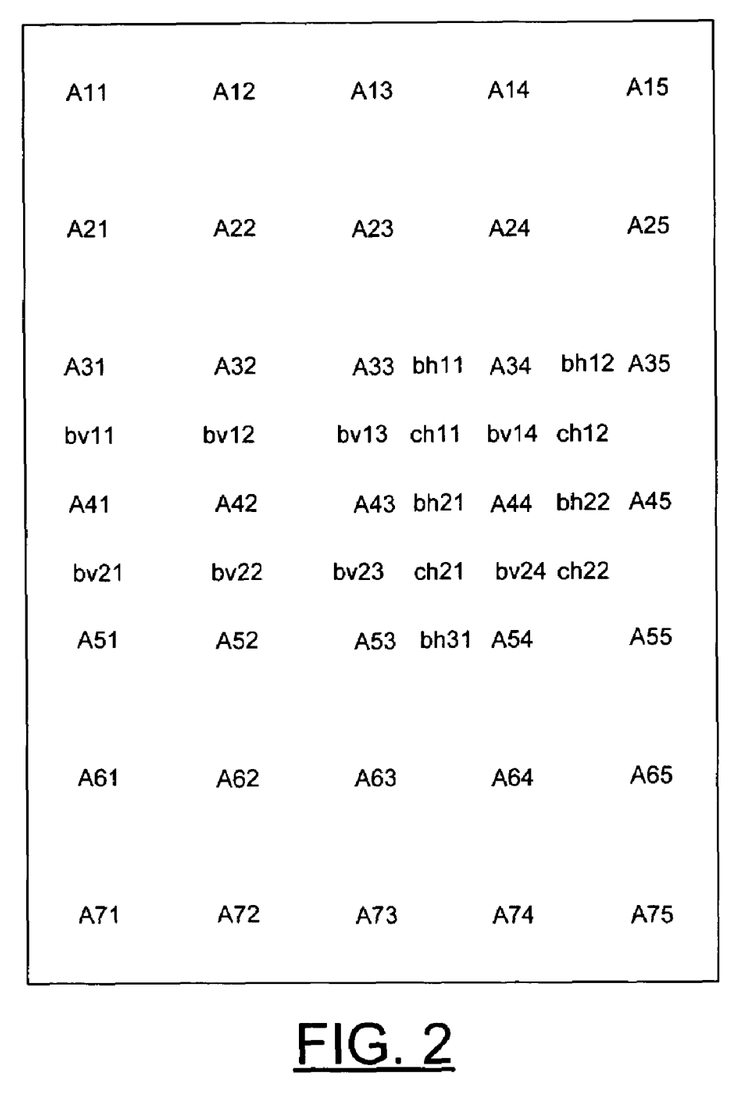
FIG. 2 is a diagram of an example half-pel interpolation.

Referring to FIG. 2, a diagram of an example half-pel interpolation is shown. The interpolation generally creates multiple interpolated reference samples (e.g., bhxy, bvxy and chxy) in a square area bounded by four actual reference samples (e.g., Axy, A(x+1)y, Ax(y+1) and A(x+1) (y+1)). The "b" interpolation samples may be aligned with either a horizontal (h) row or a vertical (v) column. The "ah" interpolation samples may be disposed at a center of four actual samples. The "x" parameter may identify a relative column. The "y" parameter may identify a relative row.

Operation of the half-pel interpolation circuit 138 may be illustrated by way of the following example. In an area established by the actual samples A33, A34, A43 and A44, the half-pel interpolation circuit 138 may calculate a first vertical interpolated sample (e.g., bv13) between the actual samples A33 and A43. A second vertical interpolated sample (e.g., bv14) may be calculated between the actual samples A34 and A44. A first horizontal interpolation sample (e.g., bh11) may be generated between the actual samples A33 and A34. A second horizontal interpolation sample (e.g., bh12) may be calculated between the actual samples A43 and A44. A center interpolation sample (e.g., ch11) may be generated at the center of the area of A33, A34, A43 and A44.

The circuit 140 may be implemented as a quarter-pel interpolation circuit. The quarter-pel interpolation circuit 140 may be operational to interpolate the samples of the reference data (e.g., integer-pel samples) and the half-pel interpolated reference samples from the half-pel resolution to the quarter-pel resolution. The signal M may transfer the quarter-pel interpolated reference samples to the circuit 142.

Figure 3:
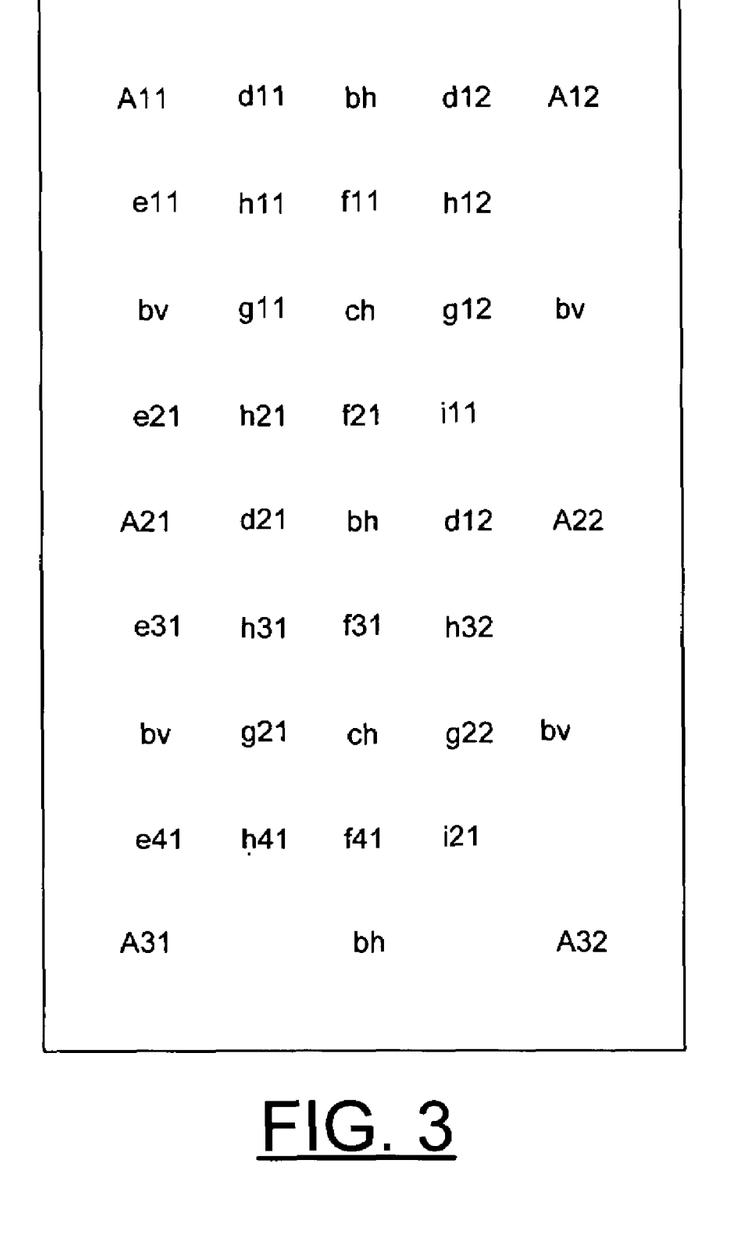
FIG. 3 is a diagram of an example quarter-pel interpolation.

Referring to FIG. 3, a diagram of an example quarter-pel interpolation is shown. The quarter-pel interpolation may generate multiple interpolation samples (e.g., dxy, exy, fxy, gxy, hxy and ixy) in the area established by four actual pixels (e.g., A11, A12, A21 and A22). The "d" interpolation samples may be located on the rows intersecting the actual reference samples. The "e" interpolation samples may be located on the columns intersecting the actual reference samples. The "f" interpolation samples may be located in the columns including the "bh" and "ch" samples. The "g" samples may be located in the rows including the "bv" and "ch" samples. The "h" and the "i" interpolation samples may be a quarter-pel horizontally and a quarter-pel vertically offset from the actual reference samples.

The circuit 142 may be implemented as a sub-pel processing circuit. The sub-pel processing circuit 142 may be arranged as an array of processing elements (see FIG. 6). Each processing element may be operational to generate an absolute difference value between a current sample from a current block 129 (e.g., via the signal ORIG_PIXEL) and a reference sample (e.g., actual or interpolated) from the reference data. The signal ABS_DIFF may carry the absolute difference values to the circuit 144. In one embodiment, the sub-pel processing circuit 142 may be implemented as a 3×3 array of processing elements operating substantially simultaneously. Other array sizes may be implemented to meet a criteria of a particular application.

The circuit 144 may be configured as an accumulation circuit. The accumulation circuit 144 may be operational to accumulate the multiple absolute difference values (e.g., in the signal ABS_DIFF) to generate a sum of absolute difference values. The signal SSAD may carry the SAD values to the circuit 146.

The circuit 146 may be implemented as a sub-pel (SPEL) sum of absolute difference (SAD) circuit. The SPEL SAD circuit 146 may be operational to identify and store the lowest (best) SAD value among each half-pel search and/or quarter-pel search performed. Storage of the lowest SAD values and the corresponding motion vectors may be implemented with registers (not shown) within the SPEL SAD circuit 146. The lowest SAD values and the motion vectors may be presented from the SPEL SAD circuit 146 in the signals QSAD and QMV, respectively.

Figure 4:
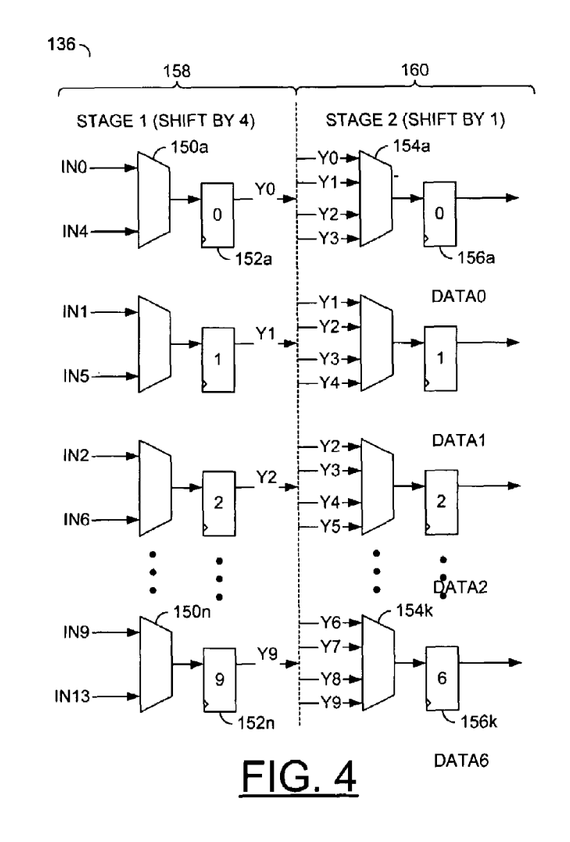
FIG. 4 is a block diagram of an example implementation of a shifter circuit.

Referring to FIG. 4, a block diagram of an example implementation of the shifter circuit 136 is shown. The shifter circuit 136 may be operational to shift a plurality of bits (e.g., 112 bits=14 samples by 8 bits per sample) and extract several bits (e.g., 56 bits=7 samples by 8 bits per sample). The unused bits may be discarded. The shifter circuit 136 generally comprises multiple multiplexers 150a-150, multiple registers 152a-152n, multiple multiplexers 154a-154k and multiple registers 156a-156n. The multiplexers 150a-150n and the registers 152a-152n may be combined to form a first stage 158. The multiplexers 154a-154k and the registers 156a-156k may be combined to form a second state 160.

Each of the multiplexers 150a-150n may receive multiple (e.g., two) samples from the signal IN (e.g., IN0-IN13). In one embodiment, each of the multiplexers 150a-150n may receive every fourth sample to execute either no shift or a shift by four positions. A reference sample routed by each of the multiplexers 150a-150n may be latched in a corresponding register 152a-152n. The registers 152a-152n may present the stored samples in signals (e.g., Y0-Y9) to the second stage 160.

Each of the multiplexers 154a-154k may receive several (e.g., four) of the signals Y0-Y9. In one embodiment, each of the multiplexers 154a-154k may receive consecutive samples in the signals Y0-9 to implement either no shift or a shift by one, two or three positions. A sample routed by each of the multiplexers 154a-154k may be latched in a corresponding register 156a-156k. The registers 156a-156k may present the stored samples in the signal DATA (e.g., DATA0-DATA6) to the half-pel interpolation circuit 138.

Figure 5:
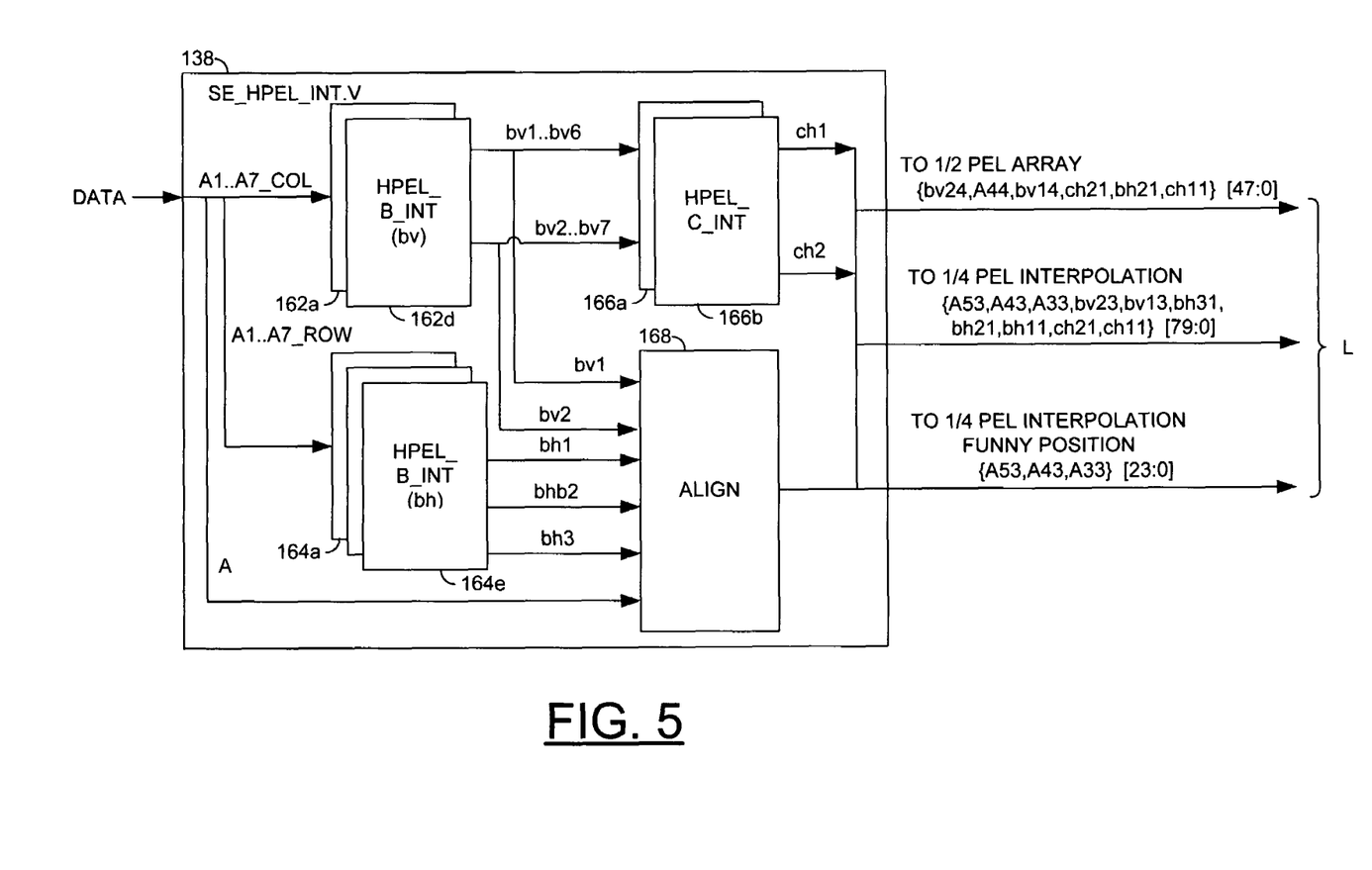
FIG. 5 is a block diagram of an example implementation of a half-pel interpolation circuit.

Referring to FIG. 5, a block diagram of an example implementation of the half-pel interpolation circuit 138 is shown. The half-pel interpolation circuit 138 generally comprises multiple circuit (or modules) 162a-162d, multiple circuits (or modules) 164a-164e, multiple circuits (or modules) 166a-166b and a circuit (or module) 168. The circuits 162a-162d, 164a-164e and 166a-166b may each be implemented as a filter circuit. The filter circuits 162a-162d may be configured to generate the vertical interpolated reference samples bvxy. The filter circuits 164a-164e may be configured to generate the horizontal interpolated reference samples bhxy. The filter circuits 166a-166b may be configured to generate the center interpolated reference samples chxy. The circuit 168 may be implemented as an align circuit. The align circuit 168 may be operational to align the interpolated samples with the actual samples to establish the half-pel resolution reference data used for the intermediate motion estimation.

The quarter-pel interpolation circuit 140 may be operational to calculate the quarter-pel interpolated samples. The calculations may be an averaging of the actual and half-pel interpolation reference samples. The quarter-pel interpolation circuit 140 may be designed as a state machine operating row by row on the half-pel resolution data. The resulting quarter-pel resolution reference samples may be used for the final motion estimation.

Figure 6:
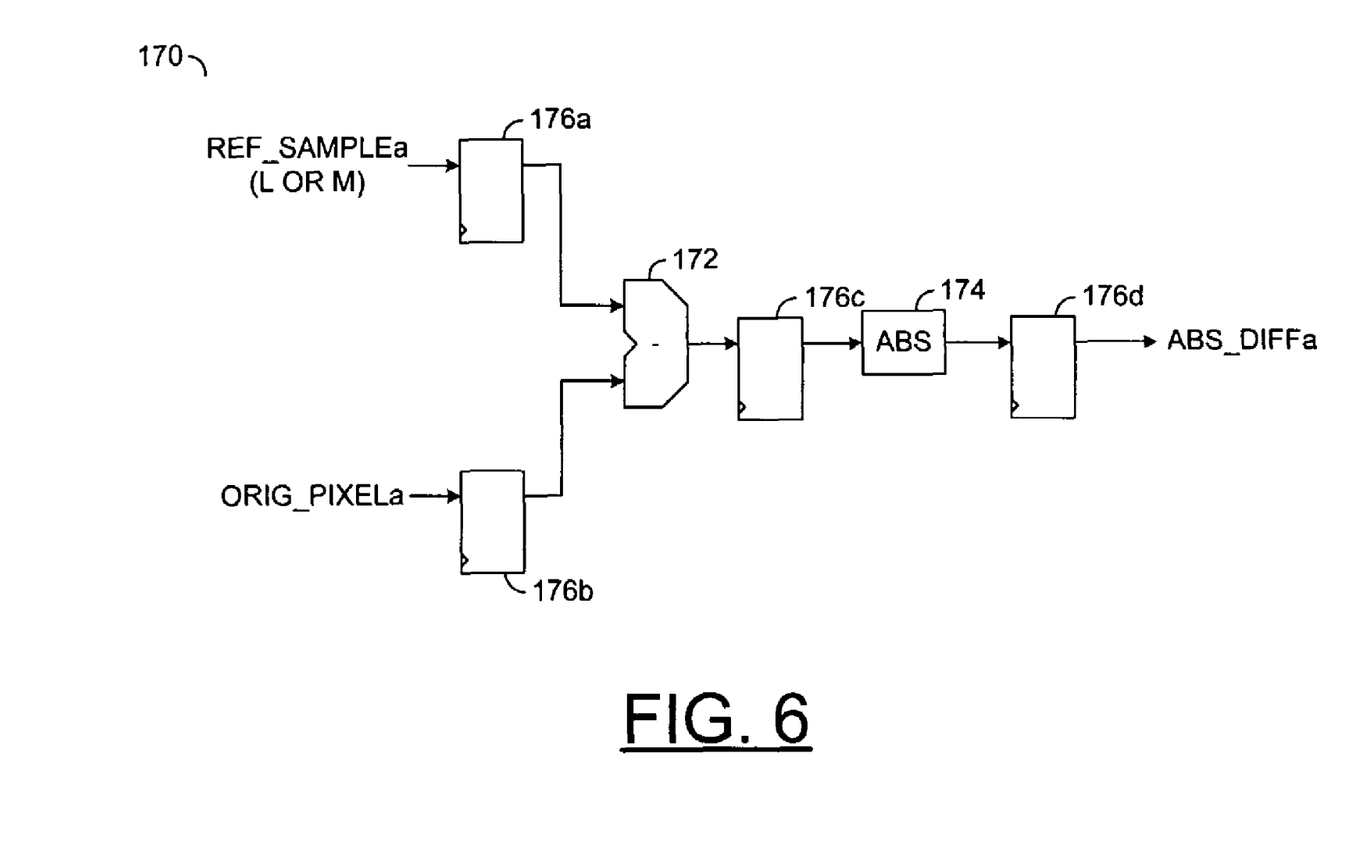
FIG. 6 is a block diagram of an example implementation of a processing element from a sub-pel processing circuit.

Referring to FIG. 6, a block diagram of an example implementation of a processing element 170 from the sub-pel processing circuit 142 is shown. The processing element 170 generally comprises a subtraction circuit 172, an absolute value circuit 174 and multiple registers 176a-176d. The register 176a may receive and store a signal (e.g., REF_SAMPLEa). The signal REF_SAMPLEa may be a sequence of the actual or interpolated reference samples from the signals L or M. The use of a particular sample in the signal REF_SAMPLEa is generally dependent on wether a half-pel resolution search or a quarter-pel resolution search is being performed. The register 176b may receive and store a current sample from a signal (e.g., ORIG_PIXELa). The actual samples in the signal ORIG_PIXELa may be a sequence of the samples for which the motion estimation is being performed. The current samples in the signal ORIG_SAMPLEa may be received from the pel search circuit 130 or directly from the external memory circuit 102.

The subtractor circuit 172 may be operational to generate a difference value in a signal based on the values of the reference sample stored in the register 176a and the current sample stored in the register 176b. Calculation of the difference value may be either the reference sample value minus the current sample value or the current sample value minus the reference sample value. The difference value may be stored in the optional register 176c.

The absolute value circuit 174 may be operational to generate an absolute difference value from the difference value. The absolute difference value may be stored in the optional register 176d. The register 176d may present the absolute difference value in a signal (e.g., ABS_DIFFa) to the accumulation circuit 144. The processing elements 170 may be repeated several times to generate many signals ABS_DIFFb-ABS_DIFFi (e.g., collectively the signal ABS_DIFF).

Figure 7:
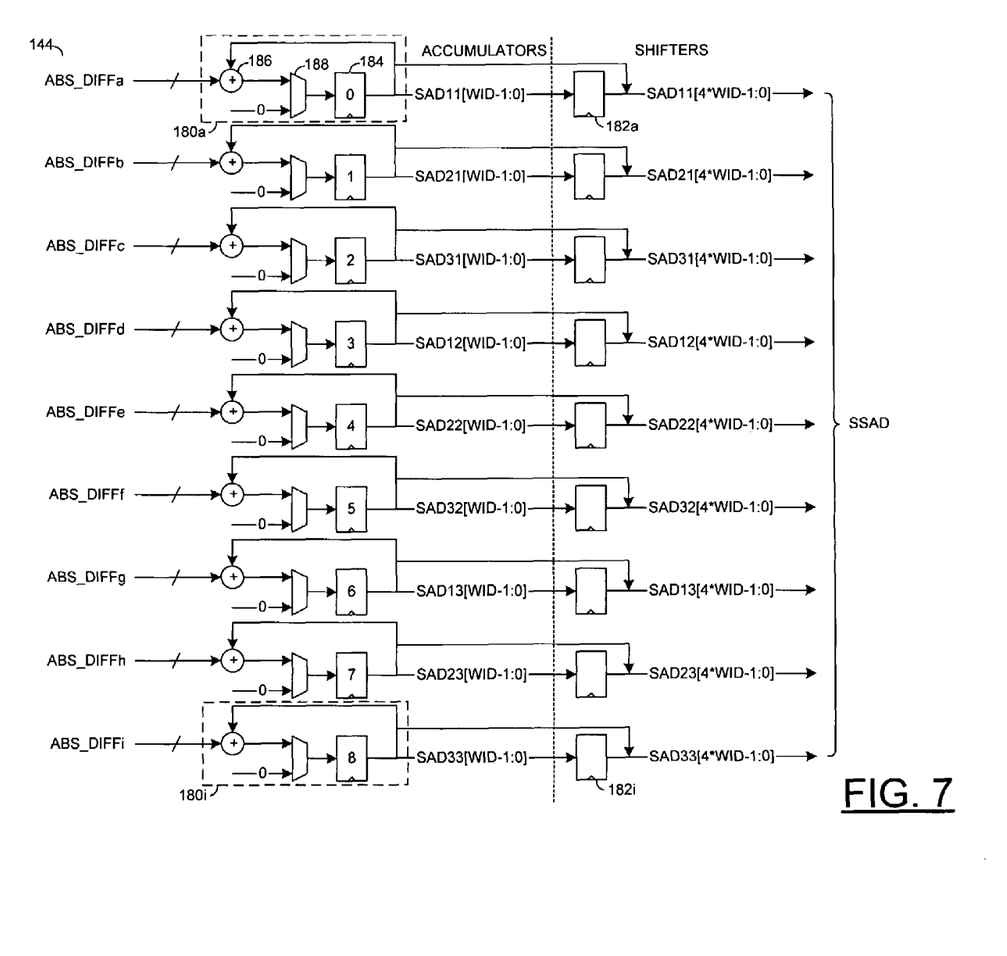
FIG. 7 is a block diagram of an example implementation of an accumulation circuit.

Referring to FIG. 7, a block diagram of an example implementation of the accumulation circuit 144 is shown. The accumulation circuit 144 may be operational to determine multiple sum of absolute difference (SAD) values for each of the processing elements 170 in the sub-pel processing circuit 142. The accumulation circuit 144 generally comprises multiple accumulators 180a-180i and multiple shifters 182a-182i. Each pair of accumulators 180x and shifter 182x (where $a \leq x \leq i$) may be associated with a single processing element 170. Each accumulator 180x generally comprises a register 184 to hold a stored value, an adder 186 to add a next absolute difference value (e.g., ABS_DIFFx) to the stored value and a multiplexer 188 to route the added value or a zero value (for reset) to the register 184 for storage. In one embodiment, nine accumulators 180a-180i and nine shifters 182a-182i may be implemented to match a 3×3 array of processing elements 170.

An output from each accumulator 180x may be provided to the corresponding shifter 180x with the multiple blocks (e.g., one 16×16 block, four 8×8 blocks, eight 8×4 blocks, eight 4×8 blocks or sixteen 4×4 blocks) being searched. A value (e.g., WID) may identify a particular partition being evaluated at a present time. The shifter 180x may use the value WID to maintain separation of the different SAD values generated during individual searches for different partitions. For example, if the pel search circuit 130 determines a MODE3 value from the integer-pel resolution search, each shifter 182a-182i may store four SAD values, one for each 8×8 partition.

The SPEL SAD circuit 146 may be implemented as a state machine. The state machine may be configured to determine a lowest SAD value among the SAD values stored in the shifters 182a-182i for each partition identified via the signal MODE. The lowest SAD value (e.g., one partition) or values (e.g., multiple partitions) may be presented in the signal QSAD by the SPEL SAD circuit 146. The motion vector or vectors corresponding to the lowest SAD values may also be presented by the SPEL SAD circuit 146 in the signal QMV.

The apparatus 100 and/or individual circuits therein may be implemented in a variety of motion estimation processors. For example, an H.264 encoder with a motion estimation processor may be implemented using of the present invention. Furthermore, encoders with motion estimation processors for other digital video compression standards that allow sub-pel, variable block size motion (e.g. MPEG-2, MPEG-4 Part 2, H.263, H.263+) may also be implemented with the present invention.

The architecture and methods of the present invention may reduce cycles of the ME processor circuit 104 for generating interpolated positions compared with conventional designs. The cycles of the ME processor circuit 104 for searching interpolated positions may also be reduced compared with conventional approaches. The present invention may provide a small motion estimation processor memory for storing interpolated samples. The Additional internal memory to the ME processor may store the best integer scores and motion vectors.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a first circuit configured to (i) generate a first motion vector for a block at an integer-pel resolution and (ii) determine a single block size among a plurality of different block sizes associated with said first motion vector; and
   a second circuit configured to (i) generate a plurality of second motion vectors at a half-pel resolution by searching a plurality of reference samples proximate said first motion vector using only said single block size, (ii) generate a plurality of third motion vectors at a quarter-pel resolution and (iii) determine a final motion vector for said block as a particular one of said first motion vector, said second motion vectors and said third motion vectors.

2. The apparatus according to claim 1, wherein said second circuit comprises a plurality of processing elements configured to generate a plurality of difference values by calculating a plurality of absolute values substantially simultaneously, wherein each one of said processing elements is configured to generate one of said difference values between a first sample from said block and a corresponding second sample of said reference samples.

3. The apparatus according to claim 2, wherein (i) said second circuit further comprises an accumulation circuit configured to generate a plurality of sum values by calculating a plurality of sum of absolute differences from said difference values and (ii) each one of said sum values is calculated from a corresponding plurality of said difference values in parallel.

4. The apparatus according to claim 3, wherein said second circuit further comprises an identification circuit configured to identify said final motion vector by determining a lowest of said sum values associated with said single block.

5. The apparatus according to claim 4, wherein said plurality of processing elements form a three by three array generating nine of said difference values in parallel.

6. The apparatus according to claim 1, wherein said second circuit further comprises a predictor memory configured to store said reference samples received from said first circuit.

7. The apparatus according to claim 6, wherein said second circuit further comprises a shifter circuit configured to barrel-shift said reference samples read from said predictor memory.

8. The apparatus according to claim 7, wherein said second circuit further comprises a first interpolation circuit configured to generate additional reference samples at said half-pel resolution by interpolating said reference samples received from said shifter circuit.

9. The apparatus according to claim 8, wherein said second circuit further comprises a second interpolation circuit configured to generate more reference samples at said quarter-pel resolution by interpolating said reference samples received from said first interpolation circuit.

10. The apparatus according to claim 7, wherein said shifter circuit is further configured to shift each of a plurality of columns of said reference samples received from said predictor memory, one of said columns at a time, to align with seven outputs.

11. The apparatus according to claim 1, wherein generation of said third motion vectors comprises searching proximate only one of said second motion vectors uses only said single block size.

12. The apparatus according to claim 6, further comprising:
   a search memory configured to store said reference samples used to determine said first motion vector; and
   an external memory configured to store both (i) said reference samples and (ii) said block.

13. A method for generating a final motion vector for a block, comprising the steps of:
   (A) generating a first motion vector at an integer-pel resolution and determining a single block size among a plurality of block sizes associated with said first motion vector;
   (B) generating a plurality of second motion vectors by searching a plurality of reference samples proximate said first motion vector at a half-pel resolution using only said single block size;
   (C) generating a plurality of third motion vectors; and
   (D) determining said final motion vector for said block as a particular one of said first motion vector, said second motion vectors and said third motion vectors.

14. The method according to claim 13, wherein step (B) further comprises the sub-step of:
   generating said third motion vectors by searching proximate only one of said second motion vectors.

15. The method according to claim 14, wherein generating of said third motion vectors is performed at only said single block size.

16. The method according to claim 13, further comprising the step of:
   determining said single block size among at least seven block sizes.

17. The method according to claim 13, further comprising the step of:

generating a plurality of difference values by calculating a plurality of absolute differences substantially simultaneously, wherein each of said absolute differences is between a first sample from said block and a corresponding second sample of said reference samples.

18. The method according to claim 17, further comprising the step of:

generating a plurality of sum values by calculating a plurality of sum of absolute differences from said difference values, wherein each one of said sum values is calculated from a corresponding plurality of said difference values in parallel.

19. The method according to claim 18, further comprising the step of:

identify said final motion vector as a lowest of said sum values associated with said single block.

20. A circuit comprising:

means for (i) generating a first motion vector for a block at an integer-pel resolution and (ii) determining a single block size among a plurality of block sizes associated with said first motion vectors;

means for (i) generating a plurality of second motion vectors at a half-pel resolution by searching a plurality of reference samples proximate said first motion vector using only said single block size and (ii) determining a plurality of third motion vectors at a quarter-pel resolution using only said single block size; and means for determining a final motion vector for said block as a particular one of said first motion vector, said second motion vectors and said third motion vectors.

* * * * *